Figures 1, 2:
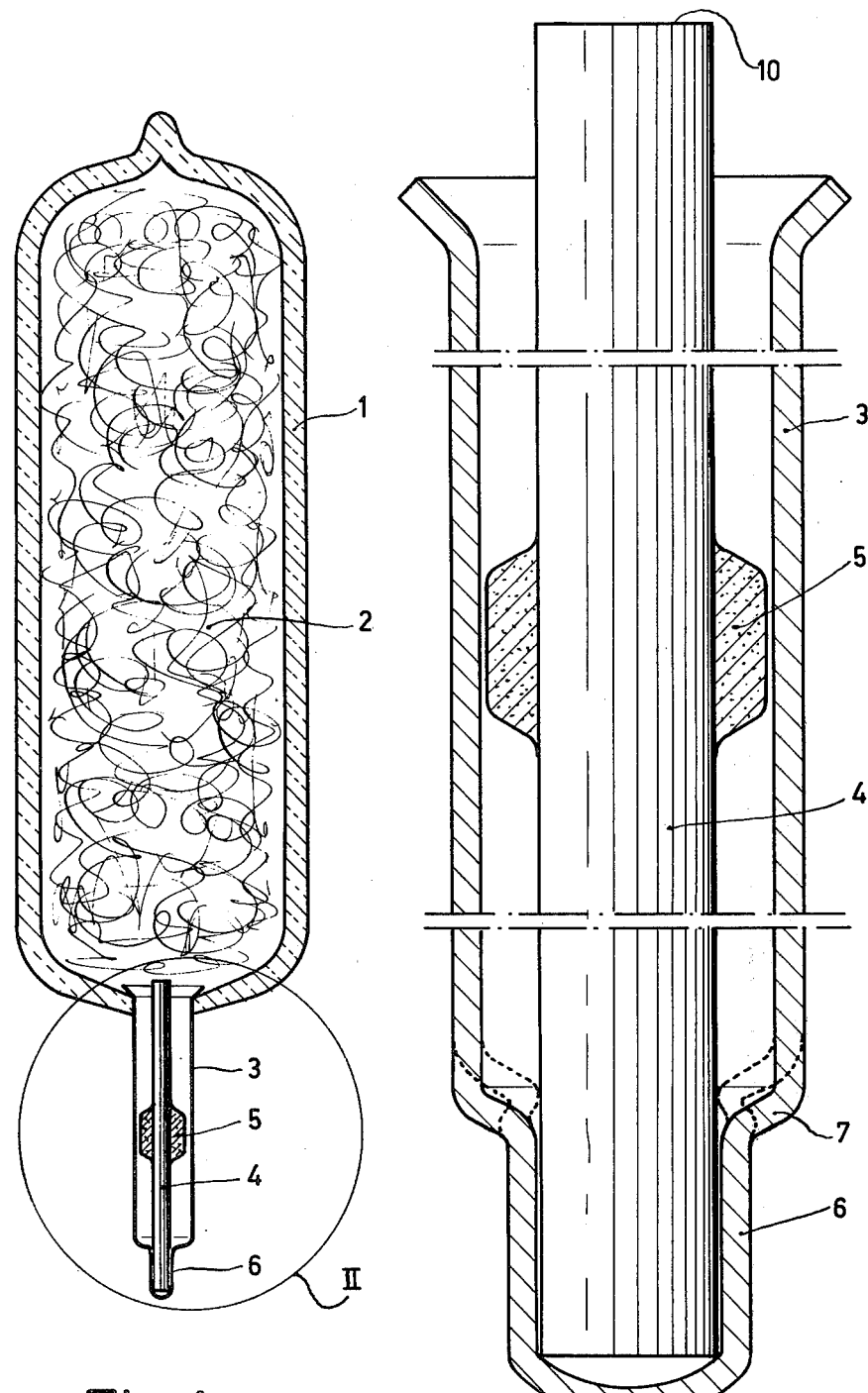

United States Patent [19]

Roelevink

[11] 3,955,911

[45] May 11, 1976

[54] PERCUSSION FLASHLAMP

[75] Inventor: Bauke Jacob Roelevink, Terneuzen, Netherlands

[73] Assignee: U.S. Philips Corporation, New York, N.Y.

[22] Filed: Mar. 27, 1974

[21] Appl. No.: 455,499

[30] Foreign Application Priority Data

Apr. 16, 1973  Netherlands ..................... 7305265

[52] U.S. Cl. ............................................... 431/93
[51] Int. Cl.² ............................................ F21K 5/02
[58] Field of Search ............................... 431/93, 94

[56] References Cited
UNITED STATES PATENTS 3,567,351  3/1971  Harvey ................................. 431/93
3,625,641  12/1971  Shaffer ................................. 431/93
3,776,685  12/1973  Senft et al ............................ 431/93
3,836,317  9/1974  Lukas ................................... 431/93

*Primary Examiner*—Carroll B. Dority, Jr.
*Attorney, Agent, or Firm*—Frank R. Trifari

[57] ABSTRACT

The invention relates to a percussion flash-lamp which comprises a lamp envelope and a metal tube sealed thereto, in which tube an anvil and an ignition mass are provided. At its end remote from the lamp envelope the metal tube comprises a cylindrical narrowed portion in which the anvil is fixed so as to extend coaxially in the tube. The anvil is shaped as a straight cylindrical wire.

1 Claim, 2 Drawing Figures

PERCUSSION FLASHLAMP

The invention relates to a percussion flashlamp which comprises a lamp envelope formed from a transparent material and filled with a combustible material and a gas which maintains the combustion, a metal tube in which an anvil is fixed in the form of a wire which extends coaxially in the tube being sealed to said lamp envelope, an ignition mass being present between the anvil and the inner wall of the tube. Such a percussion flashlamp is known.

In the known percussion flashlamps of this type the anvil, besides at its end remote from the lamp vessel, is supported in the metal tube in a place nearer to the lamp envelope. For that purpose, the anvil comprises in said place nearer to the lamp envelope a number of projections which bear against the inner wall of the metal tube. It has also been proposed already to give the metal wire in said places a few twists which bear against the inner wall of the metal tube. In behalf of the clamping in the metal tube, the anvil in said known percussion flashlamps frequently comprises a thickening at its end remote from the lamp envelope, the metal tube locally showing a constriction which bears against said thickening and thus prevents a movement of the anvil in the axial direction relative to the metal tube.

A first drawback of said known percussion flashlamp is that the projections of twists constitute an obstruction for the flow of the gas which flows to the lamp envelope when the ignition mass is ignited. If said projections or twists would not be present, a smaller quantity of ignition mass would be necessary for firing the lamp. Moreover, forces are exerted by the gas flow on said projections or twists, so that the anvil should be rigidly fixed in the axial direction also.

A second drawback of this known percussion flashlamp is that the metal wire should be subjected to a processing prior to mounting it in the metal tube, during which process the thickening at its ends and the projections of twists are formed.

A further drawback is that the anvil is not symmetrical relative to a plane transverse to the longitudinal direction of the anvil and through the centre thereof, as a result of which the anvil has to be brought in the correct position for mounting in the metal tube.

It is the object of the invention to provide a percussion flashlamp which does not exhibit said drawbacks. For that purpose, the percussion flashlamp according to the invention is characterized in that only the end portion of the anvil remote from the lamp envelope is fixed in a narrowed cylindrical tube portion which occurs at the end of the tube remote from the lamp envelope.

It has been found that, when a metal tube is used which has a narrowed portion in which the anvil is fixed, support of the anvil in other places is superfluous. Nor need the anvil be provided with projections or twists which adversely influence the flow of the gas from the tube, so that a minimum quantity of ignition mass will suffice. No particular mechanical requirements are imposed upon the connection of the anvil in the tube, so that a simple clamping operation by means of, for example, rolls can be used. Furthermore, when the percussion flashlamp is used in a so-called flash cube, the mounting of the flashlamp on a base plate which forms part of the flash cube is facilitated due to the presence of the narrowed portion of the metal tube.

A favourable embodiment of the percussion flashlamp according to the invention is characterized in that the narrowed portion of the tube is connected to the remaining part of the metal tube by means of a conical portion. Since the narrowed portion and the remaining part of the tube are connected by a frusto-conical and hence as it were searching portion, the insertion of the anvil into the metal tube is facilitated. The anvil is preferably clamped in the tube at the area of the frusto-conical portion of the tube. The material of the tube is reinforced as a result of the clamping operation.

A further favourable embodiment of the percussion flashlamp according to the invention is characterized in that the anvil is formed as a straight metal cylinder whose end portion remote from the lamp envelope is fixed in the narrowed portion of the tube over a length which is equal to or larger than the diameter of the cylinder. It has been found that a sufficiently rigid clamping of the anvil in the metal tube is obtained when the anvil is fixed in the same manner.

Another favourable embodiment of the percussion flashlamp according to the invention is characterized in that the ignition mass is present centrally between the ends of the anvil. This embodiment is particularly favourable when during the manufacture of the flashlamp the ignition mass is provided on the anvil before the anvil is assembled in the tube. In that case, actually, due to the symmetry of the anvil, the orientation of the anvil relative to the tube is superfluous.

The invention will be described in greater detail with reference to the drawing, in which FIG. 1 shows an embodiment of the percussion flashlamp according to the invention and FIG. 2 shows the encircled part of FIG. 1 on an enlarged scale.

The percussion flashlamp shown in FIG. 1 comprises a glass lamp envelope 1 which is filled with a combustible material 2, for example, chipped zirconium foil, and oxygen to maintain the combustion. Sealed to the lamp envelope 1 is a metal tube 3 comprising an anvil 4 and an ignition mass 5 of zirconium powder, potassium chlorate, red phosphorus and a binder present between the anvil and the inner wall of the tube.

As is known, this flashlamp can be fired by exerting a percussion laterally on the metal tube so that the ignition mass is ignited. This causes a gas flow with glowing zirconium particles through the metal tube to a lamp envelope, as a result of which the zirconium foil 2 is ignited.

As shown in FIG. 2, the metal tube 3 at its end remote from the lamp envelope 1 comprises a narrowed cylindrical portion 6 in which the anvil 4 is fixed. The transition from the narrowed portion 6 to the remaining part of the tube is formed by a frusto-conical portion 7 so that upon assembly of the flashlamp the insertion of the anvil into the narrowed portion 6 is easy. The anvil is fixed in the tube by pressing the material of the frusto-conical portion 7 in a few places of its circumference against the anvil 4 by means of conical pins. Due to this way of fixing, a rigid connection of the anvil extending coaxially in the tube is realized. The anvil need not be supported in other places.

In this embodiment the anvil is formed as a straight metal cylinder whose diameter is 1 mm. The length of the narrowed portion 6 is also 1 mm, while the distance between the places where the material of the conical portion 7 is pressed against the anvil and the bottom 8 of the tube is approximately 1.2 mm.

The ignition mass denoted by 5 is present centrally between the ends 10 and 11 of the anvil. As shown in FIG. 2, no obstacles which impede the gas flow resulting from the ignition of the ignition mass are present between the ignition mass and the lamp envelope. As a result of this, a minimum quantity of ignition mass will suffice and no large forces are exerted on the anvil upon firing the flashlamp.

What is claimed is:

1. A percussion flashlamp which comprises a lamp envelope formed from a transparent material and filled with a combustible material and a gas which maintains the combustion, a metal tube sealed to said lamp envelope, a generally cylindrical anvil extending coaxially in said tube and an ignition mass disposed between the anvil and the inner wall of the tube at one axial portion substantially midway between the axial extremities of said anvil, said tube having an axial elongated cylindrical section remote from said lamp envelope of smaller internal diameter and dimensioned for snug fitting engagement with the end of said anvil remote from the lamp envelope, said tube intermediate said axial section and the remaining axial portion of said tube being frusto-conical in contour, said frusto-conical portion being crimped against said anvil at a plurality of circumferentially spaced points, and said axial section being greater in length than the diameter of said tube.

* * * * *